United States Patent [19]

Presley

[11] 4,146,244

[45] Mar. 27, 1979

[54] RACK AND PINION POWER STEERING DEVICE

[75] Inventor: Rex W. Presley, Livonia, Mich.

[73] Assignee: The Bendix Corporation, Southfield, Mich.

[21] Appl. No.: 801,882

[22] Filed: May 31, 1977

[51] Int. Cl.² .................... F15B 9/10; F16J 15/18
[52] U.S. Cl. .................................. 280/96; 91/378; 92/110; 92/166; 74/498; 180/148
[58] Field of Search ............. 91/374, 378; 92/136, 92/166; 74/498; 180/148; 280/96

[56] References Cited

U.S. PATENT DOCUMENTS

| | | | |
|---|---|---|---|
| 577,342 | 2/1897 | Bain | 92/136 |
| 2,031,527 | 2/1936 | Dodson | 91/374 |
| 2,221,150 | 11/1940 | Rebeski | 91/374 |
| 2,828,722 | 4/1958 | Bohnhoff et al. | 92/136 |
| 3,880,050 | 4/1975 | Rometsch | 91/374 |
| 3,930,436 | 1/1976 | Hedenberg | 91/49 |
| 4,028,996 | 6/1977 | Joblonsky | 91/401 |

*Primary Examiner*—Paul E. Maslousky
*Attorney, Agent, or Firm*—Paul David Schoenle; Ken C. Decker

[57] ABSTRACT

A rack and pinion power steering device includes a housing within which the pinion engages the rack to impart movement to the rack upon rotation of the pinion. The rack includes a bore for slidably receiving a pair of plugs which support the rack and a rod which extend through the plugs and housing to engage a pair of dirigible wheels. The plugs cooperate with the rod to form pressure chambers and a valve member carried by the rack cooperates with projections on the rod to communicate pressurized fluid from a pressure source to either of the pressure chambers whereupon the pressurized fluid therein urges the rod to move relative to the housing. The rod also provides for communication of pressurized fluid from the pressure source to the valve member via a passage therein.

20 Claims, 1 Drawing Figure

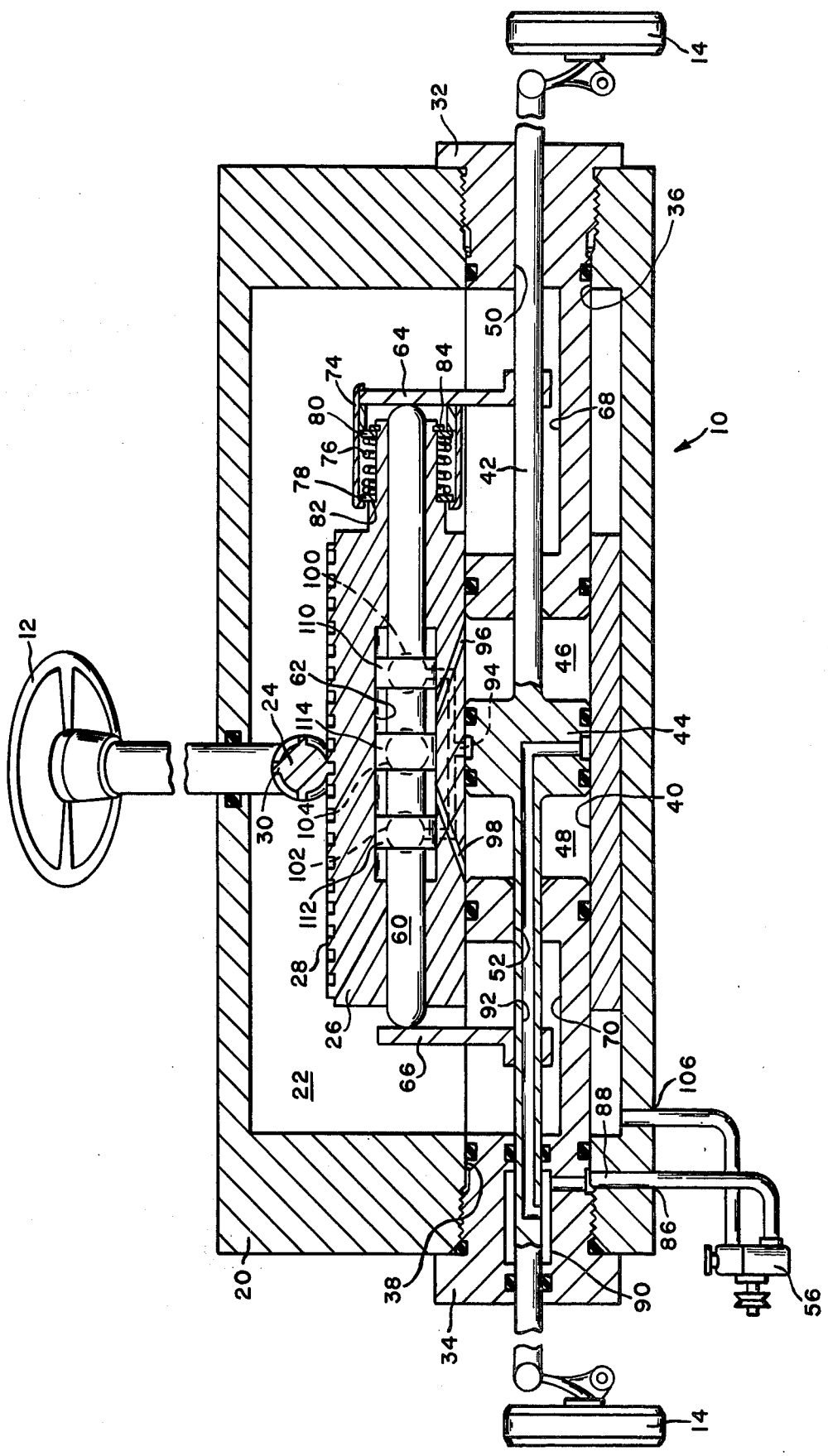

RACK AND PINION POWER STEERING DEVICE

BACKGROUND OF THE INVENTION

In a rack and pinion steering system, the pinion is coupled to a steering wheel and engaged with the rack such that turning of the steering wheel rotates the pinion thereby imparting movement to the rack. Moreover, the rack in a conventional rack and pinion steering system is cooperatively engaged with a pair of dirigible wheels so that movement of the rack imparts a change in direction for the dirigible wheels.

With a rack and pinion power steering system, a pressure source develops pressurized fluid and a rotary valve coupled to the pinion communicates the pressurized fluid to pressure chambers to assist the rack in its movement with the rotating pinion to change the direction of the dirigible wheels.

U.S. patent application Ser. No. 765,499 is a related rack and pinion power steering system wherein a rack carries a valve member for controlling fluid communication to a pair of chambers to provide a power assist to the movement of the rack.

SUMMARY OF THE PRESENT INVENTION

The present invention relates to a rack and pinion power steering device wherein the rack which engages the pinion does not operatively engage the dirigible wheels but instead supports a rod which is movable relative to a housing to change the direction of the dirigible wheels. Moreover, the rack also supports a valve member which is operable when the pinion is rotating and the rack is moving to communicate pressurized fluid from a pressure source to a rack bore wherein the pressurized fluid imparts movement to the rod.

In particular a housing includes a cavity within which the pinion engages the rack for movement therein. The rack includes a bore for slidably receiving a pair of plugs at each end of the bore and these plugs movably support the rack within the housing cavity. The plugs also include coaxial bores for receiving a rod and an enlarged portion of the rod between the plugs cooperates with the plugs and bore to define pressure chambers.

A second bore on the rack slidably supports or carries a spool valve which cooperates with passages in the rack to communicate pressurized fluid to the pressure chambers. The pressurized fluid is generated by a suitable pressure source and the housing rod and rack include passages which communicate the pressure source with the spool valve.

When the pinion is rotated, the rack moves on the plugs and the spool valve which extends from the rack engages projections attached to the rod. The spool valve is prevented from moving relative to the rod by these projections so that the rack moves relative to the rod and the spool valve in order to communicate the pressure source with one of the pressure chambers while venting the other pressure chamber to the housing cavity and an outlet port on the latter.

A spring between the rack and projections opposes the relative movement between the rack and rod while centering the rack between the projections.

It is an object of the present invention to provide a rack and pinion power steering gear wherein the rack forms pressure chambers and a rod disposed in the pressure chambers is movable in response to pressurized fluid within the pressure chambers to change the direction of a pair of dirigible wheels.

DESCRIPTION OF THE DRAWING

The sole FIGURE is a schematic illustration, partly in cross section, of a rack and pinion power steering device made in accordance with the present invention.

DETAILED DESCRIPTION

The rack and pinion power steering device 10 illustrated in the sole FIGURE includes a steering wheel 12 which is generally positioned within a vehicle operator's compartment for rotation by a vehicle operator and a pair of dirigible wheels 14 for steering the vehicle. The steering gear of the rack and pinion power steering device 10 is disposed within a housing 20 which defines a cavity 22.

A pinion 24 coupled to the steering wheel 12 extends into the housing cavity 22 and engages a rack 26. Teeth 28 on the rack 26 engage matching gears 30 on the pinion 24 so that rotation of the pinion 24 imparts transverse movement to the rack 26.

In accordance with the invention the rack 26 is movably supported within the housing cavity 22 by means of a pair of plugs 32 and 34. The plugs 32 and 34 are inserted in respective openings 36 and 38 on the housing 20 in order to rigidly attach the plugs to the housing. A bore 40 is provided in the rack 26 to sealingly and slidably receive the plugs 32 and 34, so that the rack slides on the plugs when the pinion is rotated.

The bore 40 also receives a rod 42 which is provided with an enlarged portion 44 forming a piston in sealing and sliding engagement with the bore 40. The piston 44 cooperates with the respective plugs 32 and 34 to form pressure chambers 46 and 48 on opposite sides of the piston 44. The rod 42 extends from the enlarged portion 44 to the dirigible wheels 14 through coaxial bores 50 and 52 in the respective plugs 32 and 34.

A further aspect of the present invention provides for slidably mounting a valve member or spool valve 60 within a stepped bore 62 on the rack 26. The valve member 60 is movable within the bore 62 to communicate the bore 62 with corresponding pressure chambers 46 and 48. The valve member is disposed between a pair of projections 64 and 66 which are rigidly secured to the rod 42 within respective slots 68 and 70 on the plugs 32 and 34. Consequently, the valve member 60 is movable relative to the rack 26 when the rack 26 moves relative to the rod 42. For example, when the pinion is rotated to impart movement to the rack relative to the rod 42, the valve member 60 remains stationary relative to the rod 42 so that the valve member 60 is moving relative to the moving rack. It is noted that the valve member protrudes or extends out of the rack 26 in order to engage the projections while permitting movement of the rack 26 between the projections.

The projection 64 supports a flange 74 which in turn, carries a spring 76 between rings 78 and 80. The rings 78 and 80 form an interference fit with a shoulder 82 on the rack 26 and a snap ring 84 carried by the rack 26. Consequently, any movement between the rack 26 and the projection 64, or rod 42, is resiliently opposed by the spring 76.

In order to provide for a power assist to the rack and pinion power steering device 10, the housing 20 includes an inlet port 86 which communicates with a pressure source 56. A first passage 88 in the housing communicates with a chamber 90 in the plug 34 and a second passage 92 in the rod 42 communicates the chamber 90 with an inlet passage 94 on the rack 26. The inlet passage 94 splits into two inlet passages which communicate with the stepped bore 62 via inlet ports 100 and 102 and two outlet passages 96 and 98 communicate the stepped bore 62 with respective chambers 46 and 48. A return port 104 communicates the stepped bore with the housing cavity 22 and an outlet port 106 is coupled to the pressure source to complete the system.

MODE OF OPERATION

The rack and pinion power steering device 10 is illustrated in a neutral steering position wherein the dirigible wheels are directed straight ahead. In this position pressurized fluid from the pressure source 56 is communicated via passage 88, chamber 90, passage 92, passage 94, ports 100 and 102, port 104, cavity 22 and port 106 back to the pressure source 56. As the ports 100, 102 and 104 are wider than corresponding lands 110, 112 and 114 on the valve member 60, pressurized fluid is communicated from ports 100 and 102 into respective passages 96 and 98 in order to pressurize chambers 46 and 48. With the pinion, rack and valve member centered in the neutral position, equal fluid flow communicates through ports 100 and 102 past respective lands 110 and 112 so that the pressure within chambers 46 and 48 is equalized.

When the steering wheel 12 is rotated an increment in the clockwise direction viewing the Figure, the pinion 46 rotates clockwise to move the rack to the left. As the valve member 60 remains stationary with the rod 42, the ports 100, 102 and 104 move to the left relative to their corresponding lands 110, 112, and 114. In this leftward position the port 102 is closed by the land 112 so that the chamber 48 is communicated or vented via passage 98 to the return port 104 which is opened wider to the passage 98. Meanwhile, port 100 is opened wider to passage 96 so that the pressure communicated to the chamber 46 is increased. Consequently, the increased pressure in chamber 46 urges the piston 44 and rod 42 to move to the left thereby changing the direction of the dirigible wheels according to the steering wheel rotation. It is noted that movement of the rod to the left also moves the projections 64 and 66 to the left so that the valve member is moved to the left back to a neutral steering position relative to the rack. With the steering wheel 12 remaining in the incremental clockwise rotated position, the rod 42 will remain displaced relative to the housing to maintain the changed direction for the dirigible wheels.

When the steering wheel 12 is rotated an increment in the counterclockwise direction, the rack moves to the right viewing the Figure, in order to close the inlet port 100 to the pressure chamber 46 while venting the latter to the return port 104 via passage 96. Moreover, this rightward movement of the rack 26 opens the inlet port 102 wider to the passage 98 to increase the pressure of the fluid within chamber 48. Consequently, the piston 44 and rod 42 are urged to the right to change the direction of the dirigible wheels 14.

It is noted that any movement of the rack 26 relative to the rod 42 is opposed by the spring 76 so that the vehicle operator feels a portion of the steering resistance by the dirigible wheels 14. Moreover, if the power assist provided by the pressure source 56 fails for any reason the rack is movable to an engaged position with either projection 64 or 66 to manually change the direction of the dirigible wheels 14 according to the amount of rotation of the steering wheel 12.

Appropriate sealing means are provided to seal the housing and the pressure chambers and the rod second passage 92 is enlarged at the interface between the rack and piston so that relative movement between the piston and rack will not disconnect the rod passage 92 from the rack passage 94.

Although the invention has been described with reference to the sole Figure, it is evident that many alternatives and/or variations are readily apparent to those skilled in the art. Accordingly, it is intended that all such alternatives and/or variations fall within the scope of the present invention as measured by the appended claims.

I claim:

1. A steering device comprising:
   a housing defining a cavity;
   a pinion extending into said housing cavity;
   a rack movably disposed within said housing cavity and engaging said pinion;
   a rod extending through said housing and being movable relative thereto, said rod cooperating with said rack to substantially define at least one pressure chamber; and
   a valve member carried by said rack, said valve member cooperating with said rack to communicate pressurized fluid to said one pressure chamber in order to provide for movement of said rod relative to said housing.

2. The steering system of claim 1 in which said rod carries at least one projection which engages said valve member, said rack carries a resilient member and said resilient member engages said one projection when said rack is movable relative to said rod.

3. The steering system of claim 1 in which said housing defines a first passage communicating with a fluid pressure source and said rod includes a second passage communicating with said first passage, said second passage communicating said fluid pressure source with said valve member via passages in said rack.

4. The steering system of claim 1 in which said rack includes a bore extending therethrough and said rod is slidably disposed within said bore.

5. A steering device comprising:
   a housing defining a cavity therein;
   a pinion extending into said housing cavity;
   a rack engaging said pinion and being movably disposed within said housing cavity, said rack having a bore extending therethrough;
   a rod extending into said housing cavity and slidably engaging said rack bore, said rod also sealingly engaging a wall of said rack bore; and
   at least one plug engaging said housing and slidably engaging said rack bore in order to movably dispose said rack within said housing cavity.

6. The steering device of claim 5 in which said rod includes an enlarged portion which sealingly engages a wall of said rack bore and cooperates with said one plug to form a pressure chamber within said rack bore.

7. A steering device comprising:
   a housing;
   a rack movably disposed within said housing and having a bore therein;
   a rod extending into said rack bore; and
   a valve member carried by said rack;
   said rod having a projection engaging said valve member and said rack being movable relative to said rod such that said projection prevents relative movement between said valve member and said rod at all times during the movement of said rack.

8. A steering device comprising:
a housing having an inlet port communicating with a pressure
a rack movably disposed within said housing and having a bore extending therethrough;
a rod extending into said rack bore and slidably engaging a wall of said rack bore to form a pair of pressure chambers within said rack bore; and
said housing having a first passage communicating with the inlet port, said rod having a second passage communicating with the housing first passage and said rack having a passage communicating said valve member with the rod second passage such that said valve member is in communication with the pressure source via said rod second passage.

9. The steering device of claim 8 in which said rack includes other passages communicating said valve member with the pair of pressure chambers.

10. The steering device of claim 8 in which a plug extends from said housing to said rack bore to movably dispose said rack within said housing, said plug having a bore for receiving said rod and said plug having a chamber communicating with said housing first passage and said rod second passage.

11. A steering device for a pair of dirigible wheels comprising:
a housing having a cavity therein;
a rotatable pinion extending into said housing cavity;
a rack movably disposed within said housing cavity and engaging said pinion, said rack having a bore extending therethrough;
a pair of plugs fixed to said housing and slidably engaging said rack bore to movably dispose said rack within said housing cavity; and
a rod slidably disposed within said rack bore, said pair of plugs having bores for receiving said rod, said rod extending from said pair of plugs to the pair of dirigible wheels and said rack being movable upon rotation of said pinion to impart movement to said rod relative to said housing and pair of plugs.

12. A steering device comprising:
a housing defining a cavity therein;
a pinion extending into said housing cavity;
a rack movably disposed within said housing and engaging said pinion, said rack having a pair of bores therethrough;
a rod extending into one of said pair of bores and being movable relative to said rack;
a valve member movably disposed within the other of said pair of bores and extending out of said rack; and
a pair of projections attached to said rod, said projections engaging said valve member to prevent relative movement between said valve member and said rod.

13. The steering device of claim 12 in which said rod slidably engages the one of said pair of bores to substantially define pressure chambers opposite the sliding engagement, said housing communicating with a pressure source such that said housing and rod cooperate to communicate the pressure source with the other of said pair of bores and said valve member being movable relative to said rack when said rack moves relative to said rod to communicate the pressure source with one of the pressure chambers while venting the other pressure chamber to the housing cavity.

14. The steering device of claim 12 in which said rack is disposed between said pair of projections and maintained in spaced relation thereto by means of a resilient member disposed between said rack and one of said pair of projections.

15. A steering device comprising:
a housing defining a cavity and having an inlet port and an outlet port;
a pinion extending into said housing cavity;
a rack movably disposed within said housing cavity, said rack carrying a valve member and having an inlet passage and a plurality of outlet passages, said inlet passage and said outlet passages communicating with said valve member; and
a rod cooperating with said rack to substantially define a pair of pressure chambers, said rod communicating said housing inlet port with said rack inlet passage and said plurality of outlet passages communicating with respective pressure chambers;
said valve member normally communicating said rack inlet passage with said plurality of outlet passages to communicate the housing inlet port with the pair of pressure chambers and said valve member being movable relative to said rack to close communication between said rack inlet passage and one of said plurality of rack outlet passages in order to communicate the one of said rack outlet passages to said housing outlet port via a rack return port communicating with the housing cavity and said valve member.

16. A steering device comprising:
a housing defining a cavity;
a pinion extending into said housing cavity;
a rack movably disposed within said housing cavity and engaging said pinion;
a rod extending into said housing cavity and being movable relative thereto; and
a valve member carried by said rack, said valve member cooperating with said rack to provide for movement of said rod relative to said housing, said rack including a bore extending therethrough and said rod being disposed within said bore, said housing including at least one plug extending into said rack and bore, said rod including an enlarged portion within said bore to substantially define a piston and said piston and said one plug cooperating with said rack bore to define a pressure chamber.

17. A steering device comprising:
a housing defining a cavity therein;
a pinion extending into said housing cavity;
a rack engaging said pinion and being movably disposed within said housing cavity, said rack having a bore extending therethrough;
a rod extending into said housing cavity and slidably engaging said rack bore; and
at least one plug engaging said housing and slidably engaging said rack bore in order to movably dispose said rack within said housing cavity, said one plug including a bore extending therethrough and said rod extending through said one plug bore.

18. A steering device comprising:
a housing defining a cavity therein;
a pinion extending into said housing cavity;
a rack engaging said pinion and being movably disposed within said housing cavity, said rack having a bore extending therethrough;

a rod extending into said housing cavity and slidably engaging a wall of said rack bore; and at least one plug engaging said housing and slidably engaging said rack bore in order to movably dispose said rack within said housing cavity, said one plug including a bore extending therethrough and said rod extending through said one plug bore;

said rod cooperating with said one plug to form a pressure chamber within said rack bore, said rack carrying a valve member, said housing communicating with a pressure source via a first passage, said rod having a second passage communicating the first passage with the rack, said rack having an inlet passage communicating the valve member with the pressure source via the rod second passage and having first passage and said valve member cooperating with said rack to communicate the pressure source with the pressure chamber via the housing first and rod second passage.

19. A steering device comprising:

a housing;

a rack movably disposed within said housing and having a bore therein;

a rod extending into said rack bore; and a valve member carried by said rack;

said rod having a projection engaging said valve member, said rack being movable relative to said rod such that said projection prevents relative movement between said valve member and said rod, and a resilient member disposed between said rack and said projection opposes relative movement between said projection and said rack.

20. A steering device comprising:

a housing;

a rack movably disposed within said housing and having a bore therein;

a rod extending into said rack bore; and a valve member carried by said rack;

said rod having a projection engaging said valve member, said rack being movable ralative to said rod such that said projection prevents relative movement between said valve member and said rod, and a plug slidably engages a wall of said rack bore, said plug having a bore for receiving said rod and said plug having a slot opening to said plug bore for receiving said projection.

* * * * *